(12) United States Patent
Shen et al.

(10) Patent No.: US 10,262,096 B2
(45) Date of Patent: Apr. 16, 2019

(54) COMPONENT PLACEMENT WITH REPACKING FOR PROGRAMMABLE LOGIC DEVICES

(71) Applicant: Lattice Semiconductor Corporation, Hillsboro, OR (US)

(72) Inventors: Yinan Shen, San Jose, CA (US); Jun Zhao, Fremont, CA (US)

(73) Assignee: Lattice Semiconductor Corporation, Portland, OR (US)

(*) Notice: Subject to any disclaimer, the term of this patent is extended or adjusted under 35 U.S.C. 154(b) by 109 days.

(21) Appl. No.: 14/194,484

(22) Filed: Feb. 28, 2014

(65) Prior Publication Data

US 2015/0248512 A1    Sep. 3, 2015

(51) Int. Cl.
*G06F 17/50* (2006.01)

(52) U.S. Cl.
CPC ...... *G06F 17/5072* (2013.01); *G06F 17/5054* (2013.01)

(58) Field of Classification Search
CPC ............ G06F 17/5027; G06F 17/5031; G06F 17/5072; G06F 17/5077; G06F 17/5081
USPC ....................................................... 716/106
See application file for complete search history.

(56) References Cited

U.S. PATENT DOCUMENTS

| | | | | |
|---|---|---|---|---|
| 5,659,484 A | * | 8/1997 | Bennett | G06F 17/5031 716/113 |
| 6,813,754 B2 | * | 11/2004 | Wu | G06F 17/5072 716/117 |
| 7,000,210 B2 | | 2/2006 | Wu et al. | |
| 7,308,671 B1 | | 12/2007 | Yuan et al. | |
| 7,337,100 B1 | * | 2/2008 | Hutton | G06F 17/5068 703/13 |
| 7,428,718 B1 | * | 9/2008 | Singh | G06F 17/5072 716/104 |
| 7,831,943 B1 | | 11/2010 | Das | |
| 8,181,139 B1 | * | 5/2012 | Chen | G06F 17/5072 716/116 |

OTHER PUBLICATIONS

Vorwerk et al., "Improving Simulated Annealing-Based FPGA Placement With Directed Moves", IEEE Transactions on Computer-Aided Design of Integrated Circuits and Systems, vol. 28, No. 2, Feb. 2009, pp. 179-192.

(Continued)

*Primary Examiner* — Jack Chiang
*Assistant Examiner* — Brandon Bowers
(74) *Attorney, Agent, or Firm* — Haynes and Boone, LLP

(57) ABSTRACT

Systems and methods are disclosed herein to provide improved placement of components in programmable logic devices (PLDs). In one example, a computer-implemented method includes receiving a design identifying operations to be performed by a PLD. The method also includes determining a layout comprising positions of components of the PLD configured to perform the operations. The method also includes performing a timing analysis on the layout. The method also includes selectively adjusting the positions of the components using the timing analysis. Related systems and non-transitory machine-readable mediums are also provided.

20 Claims, 7 Drawing Sheets

(56) References Cited

OTHER PUBLICATIONS

Marquardt et al., "Timing-Driven Placement for FPGAs", FPGA '00 Proceedings of the 2000 ACM/SIGDA eighth international symposium on Field programmable gate arrays, ACM, New York, NY, USA, Feb. 1, 2000, pp. 203-213.
Lattice Semiconductor, "Design Planning", http://www.latticesemi.com/~/media/Documents/UserManuals/1D/design_planning_document.pdf Jun. 2012, 52 pages.
Chen et al., "Simultaneous Timing Driven Clustering and Placement for FPGAs", In Proceedings of the International Conference on Field Programmable Logic and Its Applications, Computer Science Department, University of California, 2004, pp. 158-167.

* cited by examiner ated in one or more of the figures.

COMPONENT PLACEMENT WITH REPACKING FOR PROGRAMMABLE LOGIC DEVICES

TECHNICAL FIELD

The present invention relates generally to programmable logic devices and, more particularly, to component placement within such devices.

BACKGROUND

Programmable logic devices (PLDs) (e.g., field programmable gate arrays (FPGAs), complex programmable logic devices (CPLDs), field programmable system on a chips (FPSCs), or other types of programmable devices) may be configured to implement user-specified functionality. Conventionally, a user design is realized by mapping a synthesized design to a netlist of components, logically packing the netlist components together, assigning the netlist components to particular physical locations in a PLD (e.g., placement), and then routing signal paths between the physical locations.

Component placement is particularly important, as this greatly affects signal path timing. Conventional design processes typically rely on time estimates that are based on logic-level operations (e.g., logic-level delay estimation). However, such estimated timing is often inaccurate, as it does not account for the actual physical positions of the components within the PLD, and fails to consider the impact of previously placed components on newly placed components.

Some conventional techniques attempt to mitigate these difficulties by permitting the user to specify particular components to be grouped together to improve timing. However, such techniques may require significant user effort to manage and monitor the placement of the grouped components. Thus, there is a need for an improved approach to component placement in PLDs.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

In accordance with embodiments set forth herein, techniques are provided to repeatedly adjust the placement of components in various locations of a PLD to provide improved performance. Components used to implement critical signal paths of a synthesized user design are identified. Preferred regions (e.g., also referred to as target locations or wish regions) of the PLD are identified for the critical path components (e.g., based on timing analysis).

The critical path components are associated with their target locations in a list (e.g., also referred to as an object list) or other appropriate data structure (e.g., stored in a memory and/or a machine readable medium).

At various times during a PLD design process, the respective placements of the critical path components are adjusted by selectively moving the components to their identified target locations. For example, such placement adjustment (also referred to as repacking) can be performed periodically during a simulated annealing placement process, after such an annealing process, after a subsequent routing process, and/or at other times. As a result, the overall timing and efficiency of the implemented user design can be improved over conventional placement processes that rely on logic-level timing estimates.

Figure 1:
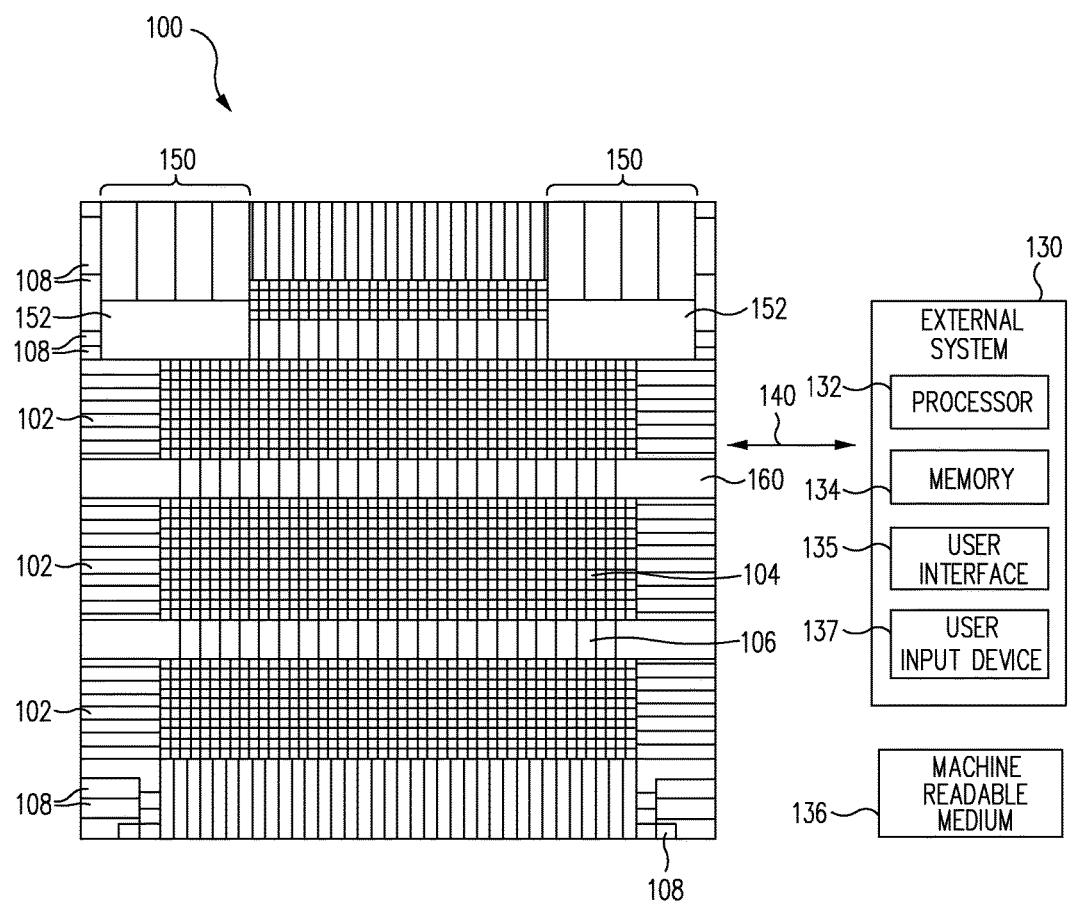
FIG. 1 illustrates a block diagram of a programmable logic device (PLD) in accordance with an embodiment of the disclosure.

Referring now to the drawings, FIG. 1 illustrates a block diagram of a PLD 100 in accordance with an embodiment of the disclosure. PLD 100 (e.g., a field programmable gate array (FPGA), a complex programmable logic device (CPLD), a field programmable system on a chip (FPSC), or other type of programmable device) generally includes input/output (I/O) blocks 102 and logic blocks 104 (e.g., also referred to as programmable logic blocks (PLBs), programmable functional units (PFUs), or programmable logic cells (PLCs)).

I/O blocks 102 provide I/O functionality (e.g., to support one or more I/O and/or memory interface standards) for PLD 100, while programmable logic blocks 104 provide logic functionality (e.g., see FIG. 2 further discussed herein) for PLD 100. Additional I/O functionality may be provided by serializer/deserializer (SERDES) blocks 150 and physical coding sublayer (PCS) blocks 152. PLD 100 also includes hard intellectual property core (IP) blocks 160 to provide additional functionality (e.g., substantially predetermined functionality provided in hardware which may be configured with less programming than logic blocks 104).

PLD 100 may also include blocks of memory 106 (e.g., blocks of EEPROM, block SRAM, and/or flash memory), clock-related circuitry 108 (e.g., clock sources, PLL circuits, and/or DLL circuits), and/or various routing resources 180 (e.g., interconnect and appropriate switching logic to provide paths for routing signals throughout PLD 100, such as for clock signals, data signals, or others) as appropriate. In general, the various elements of PLD 100 may be used to perform their intended functions for desired applications, as would be understood by one skilled in the art.

For example, I/O blocks 102 may be used for programming PLD 100, such as logic blocks 104 and memory 106, or transferring information (e.g., various types of data and/or control signals) to/from PLD 100 through various external ports as would be understood by one skilled in the art. I/O blocks 102 may provide a first programming port (which may represent a central processing unit (CPU) port, a peripheral data port, an SPI interface, and/or a sysCONFIG programming port) and/or a second programming port such as a joint test action group (JTAG) port (e.g., by employing standards such as Institute of Electrical and Electronics Engineers (IEEE) 1149.1 or 1532 standards). I/O blocks 102 typically, for example, may be included to receive configuration data and commands (e.g., over one or more connections 140) to configure PLD 100 for its intended use and to support serial or parallel device configuration and information transfer with SERDES blocks 150, PCS blocks 152, hard IP blocks 160, and/or logic blocks 104 as appropriate.

It should be understood that the number and placement of the various elements are not limiting and may depend upon the desired application. For example, various elements may not be required for a desired application or design specification (e.g., for the type of programmable device selected).

Furthermore, it should be understood that the elements are illustrated in block form for clarity and that various elements would typically be distributed throughout PLD 100, such as in and between logic blocks 104, hard IP blocks 160, and routing resources 180 to perform their conventional functions (e.g., storing configuration data that configures PLD 100 or providing interconnect structure within PLD 100). It should also be understood that the various embodiments disclosed herein are not limited to programmable logic devices, such as PLD 100, and may be applied to various other types of programmable devices, as would be understood by one skilled in the art.

An external system 130 may be used to create a desired user configuration or design of PLD 100 and generate corresponding configuration data to program (e.g., configure) PLD 100. For example, external system 130 may provide such configuration data in the form of a bitstream to one or more I/O blocks 102 and/or other portions of PLD 100. As a result, programmable logic blocks 104, routing resources 180, and any other appropriate components of PLD 100 may be configured to operate in accordance with user-specified applications.

In the illustrated embodiment, external system 130 is implemented as a computer system which may be used to perform various computer-implemented methods. In this regard, external system 130 includes, for example, one or more processors 132 which may be configured to execute instructions, such as software instructions, provided in one or more memories 134 and/or stored in non-transitory form in one or more non-transitory machine readable mediums 136 (e.g., which may be internal or external to system 130). For example, in some embodiments, external system 130 may run PLD configuration software, such as Lattice Diamond System Planner software available from Lattice Semiconductor Corporation of Hillsboro, Oreg. to permit a user to create a desired configuration and generate corresponding configuration data to program PLD 100.

External system 130 also includes, for example, a user interface 135 (e.g., a screen or display) to display information to a user, and one or more user input devices 137 (e.g., a keyboard, mouse, trackball, touchscreen, and/or other device) to receive user commands or design entry to prepare a desired configuration of PLD 100.

Figure 2:
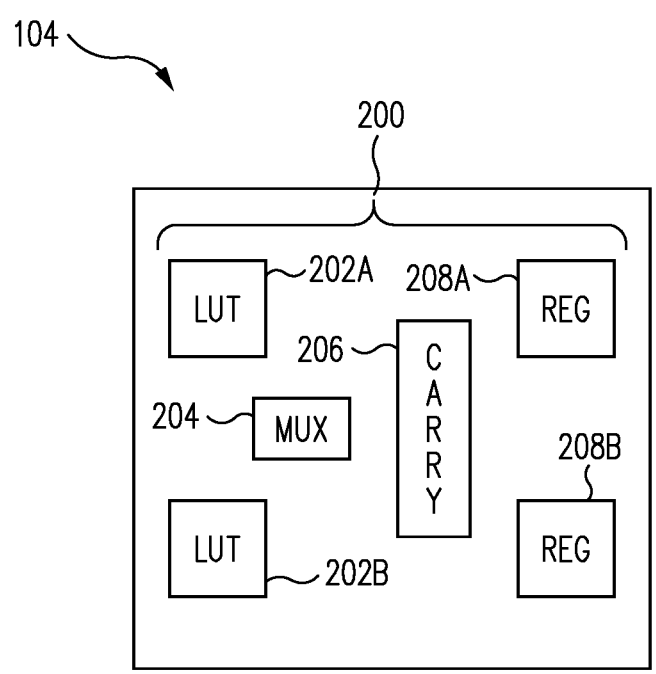
FIG. 2 illustrates a block diagram of a logic block of a PLD in accordance with an embodiment of the disclosure.

FIG. 2 illustrates a block diagram of a logic block 104 of PLD 100 in accordance with an embodiment of the disclosure. As discussed, PLD 100 includes a plurality of logic blocks 104 including various components to provide logic functionality.

In the example embodiment shown in FIG. 2, logic block 104 provides physical components 200 including: lookup tables (LUTs) 202 (individually labeled 202A and 202B), multiplexer 204, carry logic 206, and registers 208 (individually labeled 208A and 208B). In other embodiments, different combinations of physical components may be provided in logic blocks 104. Each of the various physical components 200 of logic block 104 may be used to implement a portion of a user design implemented by PLD 100. In this regard, PLD 100 may include many logic blocks 104, each of which may include physical components 200 which are used to collectively implement the user design.

As further described herein, portions of a user design may be assigned to particular logic blocks 104 and/or particular physical components 200 and subsequently reassigned (e.g., repacked) to identified target locations at various times during a design process. Such target locations may correspond to, for example, particular logic blocks 104 and/or physical components 200 thereof residing in physical locations of the PLD 100 that may result in improved timing and efficiency for critical path signals of the user design.

Figure 3:
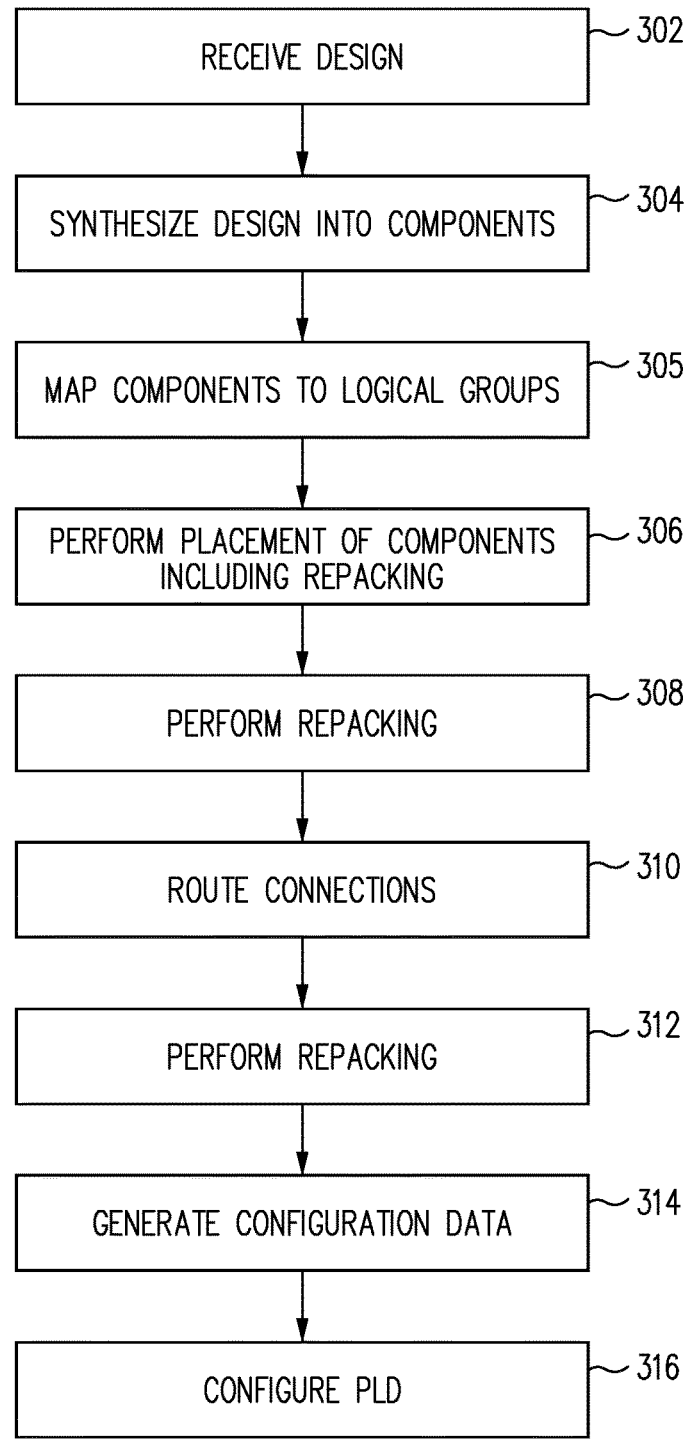
FIG. 3 illustrates a design process for a PLD in accordance with an embodiment of the disclosure.

FIG. 3 illustrates a design process for PLD 100 in accordance with an embodiment of the disclosure. For example, the process of FIG. 3 may be performed by external system 130 running Lattice Diamond software to configure PLD 100.

In operation 302, external system 130 receives a design that specifies the desired functionality of PLD 100. For example, a user may interact with external system 130 (e.g., through user input device 137 and hardware description language (HDL) code representing the design) to identify various features of the design (e.g., high level logic operations, hardware configurations, and/or other features). External system 130 may perform one or more rule checks to confirm that the design describes a valid configuration of PLD 100. For example, external system 130 may reject invalid configurations and/or request the user to provide new design information as appropriate.

In operation 304, external system 130 synthesizes the design into a set of netlist components that may be used to implement the design. For example, external system 130 may provide a netlist that identifies various types of components provided by PLD 100 and their associated signals.

In operation 305, external system 130 performs a mapping process in which sets of the netlist components are grouped (e.g., packed) together, but not yet assigned to physical logic blocks 104 of PLD 100. For example, the mapping process may associate various netlist components into groups (e.g., also referred to as logic groups) based on estimated timing (e.g., logic-level delay estimation). The groups may be assigned to particular physical logic blocks 104 during subsequent placement operation 306.

In operation 306, external system 130 performs a placement process to assign the grouped netlist components to particular physical components 200 residing at specific physical locations of the PLD 100 (e.g., assigned to particular logic blocks 104 and/or particular physical components 200 within logic blocks 104), and thus determine a layout for the PLD 100. For example, in some embodiments, the logic groups identified in operation 305 may be initially assigned to corresponding logic blocks 104. As further described herein with regard to FIG. 5, the placement process may include a simulated annealing process and may also perform repacking operations to reassign netlist components of the user design to different logic blocks 104 and/or different physical components 200 of the logic blocks (e.g., resulting in different groupings than those identified in mapping operation 305).

In operation 308, external system 130 performs an additional repacking operation after the simulated annealing placement process has been completed.

In operation 310, external system 130 routes connections among the assigned physical components 200 (e.g., using routing resources 180) to realize the physical interconnections.

In operation 312, external system 130 performs yet another repacking operation after the routing operation has been completed.

In operation 314, external system 130 generates configuration data 312 for the placed-and-routed design. In operation 316, external system 130 configures PLD 100 with the configuration data such as, for example, loading a configuration data bitstream into PLD 100 over connection 140.

As the process of FIG. 3 progresses, external system 130 calculates the timing of various signal paths of the user design with increasing accuracy. For example, prior to the placement process of operation 306, the netlist components defining the user design have not yet been assigned to particular physical components 200 of PLD 100. As a result, external system 130 may calculate signal path timing (e.g., during operation 305), but will typically be limited to estimates based on logic-level operations that do not account for additional timing adjustments caused by the locations of physical components 200 in PLD 100.

During the placement process of operation 306, a repacking operation can be performed which performs one or more timing analyses based on the current assignments to particular physical components 200. Because such timing results will account for physical placements within PLD 100, they will be more accurate than the previous estimated timing. By selectively adjusting the positions of netlist components to various different physical components 200 during repacking operations using these more accurate timing analyses, the timing and efficiency of the implemented user design can be improved.

After the placement process of operation 306, the additional repacking operation of operation 308 can further improve the design implementation with the benefit of timing analyses based on the completed simulated annealing process. Moreover, after the routing process of operation 310, the additional repacking operation of operation 312 can further improve the design implementation with the benefit of timing analyses based on routed signal paths. Thus, by providing one or more repacking operations at various stages of FIG. 3 which use increasingly more accurate timing information, the final design implementation can be improved.

Figure 4:
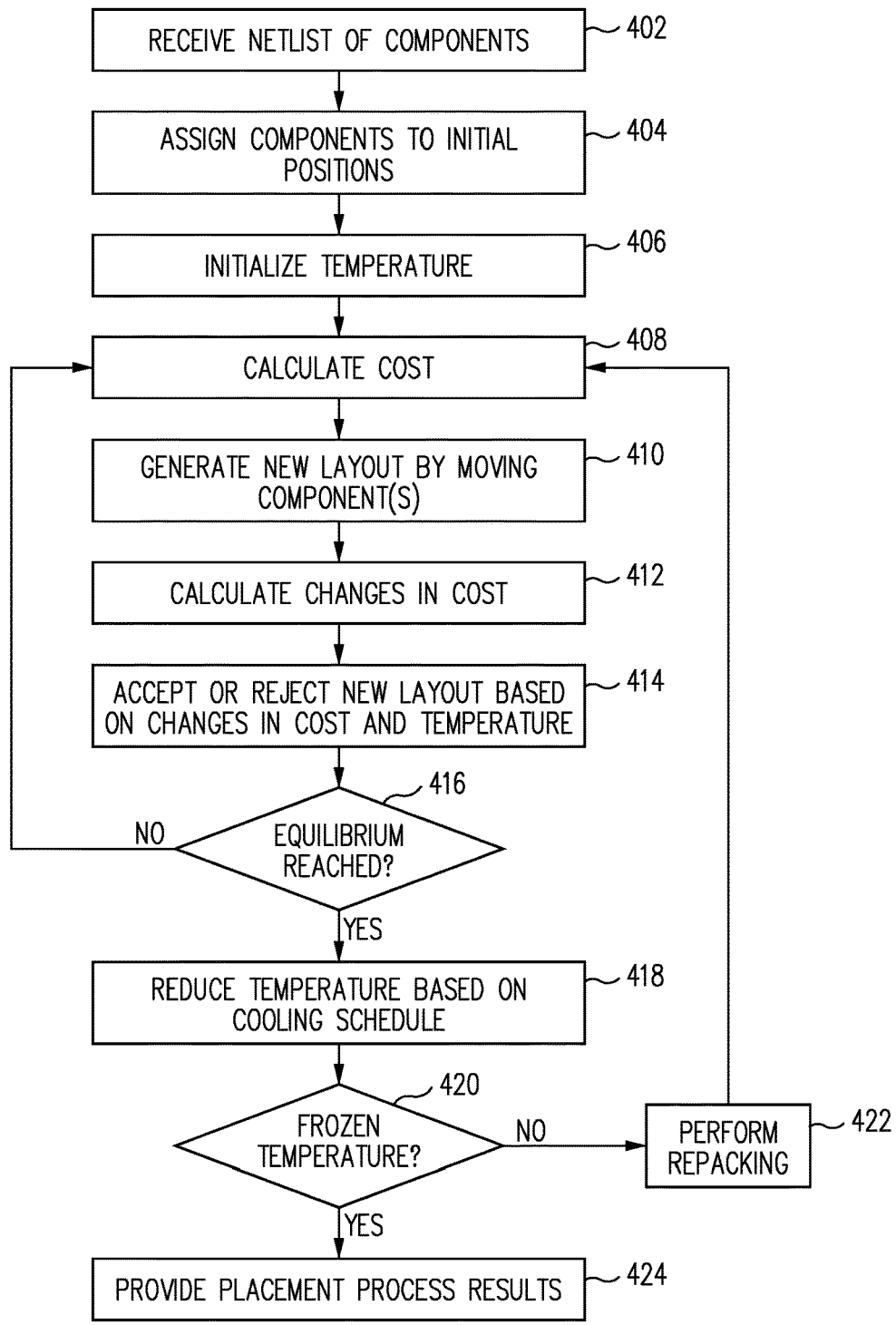
FIG. 4 illustrates a component placement process for a PLD in accordance with an embodiment of the disclosure.

FIG. 4 illustrates a component placement process for PLD 100 in accordance with an embodiment of the disclosure. In some embodiments, the process of FIG. 4 may be performed during block 306 of FIG. 3. The process of FIG. 4 may be executed by external system 130 to determine the positions (e.g., layout) of particular physical components 200 of PLD 100 used to implement a design. In particular, FIG. 4 provides a simulated annealing process in which various component placements may be simulated to determine their feasibility and compare performance. In addition, FIG. 4 performs repacking to adjust component placements based on target locations for components in critical signal paths.

In general, the simulated annealing process of FIG. 4 may be performed by iteratively changing (e.g., moving, swapping, or otherwise selecting) the placements of one or more netlist components (e.g., changing the particular physical components 200 assigned to implement the netlist components). In some embodiments, such placements may be randomly changed. A system cost may be calculated for each layout, and the system costs associated with different layouts may be compared to evaluate whether to keep a new layout (e.g., including the recently changed placements) or revert to a previous layout. In this regard, the simulated annealing process of FIG. 4 may be performed to determine a layout that has a reduced system cost.

In operation 402, external system 130 receives a netlist of components in response to operation 304 of FIG. 3. In operation 404, external system 130 generates an initial placement layout. In particular, the netlist components may be assigned to initial positions in PLD 100 (e.g., particular physical components 200 of PLD 100 may be selected to implement the synthesized design). In some embodiments, the initial positions may be determined, for example, by assigning groups of netlist components (e.g., determined in operation 305) to corresponding logic blocks 104 and the physical components 200 associated therewith. In some embodiments, the initial positions may be determined randomly, sequentially based on how the design was created, or otherwise as appropriate.

In operation 406, external system 130 sets an initial value for a temperature T of the simulated annealing process. In accordance with simulated annealing techniques, the temperature may be used to identify the process' current tolerance for accepting layout changes (e.g., component position changes). For example, while the temperature is high, the simulated annealing process will tolerate (e.g., accept) layout changes that may result in a wide range of performance improvements, or even reduced performance, as determined by the calculated system cost. However, as the temperature decreases (e.g., based on a cooling schedule in accordance with simulated annealing techniques), the simulated annealing process will apply more stringent criteria to accept any layout changes. For example, for lower temperatures, layout changes may be required to result in increased performance that exceeds appropriate thresholds (e.g., a minimum system cost reduction may be required before a layout change is accepted). Moreover, the cooling schedule may be adjusted based on how fast or how many iterations are desired in the simulated annealing process.

In operation 408, external system 130 calculates a system cost for the initial layout. In some embodiments, the system cost may be calculated by a system cost function including various factors, such as a total wire length modeled by half perimeters (e.g., a bounding box), timing performance, component congestion, and/or other factors.

For example, it is desirable in some embodiments to shorten the total wire length to reduce signal delays and conserve routing resources. Also, in some embodiments, it is desirable to reduce clock signal propagation time to improve circuit performance and reduce the likelihood of timing violations. In addition, in some embodiments, it is desirable to reduce the congestion (e.g., crowding and density) among placed components to improve the ability of PLD 100 to successfully route signals among components without exhausting routing resources in regions of high component density. Accordingly, by considering these and/or other factors in the system cost, the process of FIG. 4 may operate to reduce the effects of such factors in component layouts.

In operation 410, external system 130 generates a new layout by changing the placement (e.g., assigned positions) of one or more netlist components. For example, in some embodiments, a number of components may be randomly selected and assigned to different physical locations (e.g., different logic blocks 104 and/or different physical components 200 within logic blocks 104).

In operation 412, external system 130 calculates a new system cost associated with the new layout and determines the change in system cost over the previous layout (e.g., over the previous system cost calculated in operation 408). For example, the system cost may be calculated using a cost function as described with regard to operation 408.

In operation 414, external system 130 determines whether the new layout should be accepted based on the change in the system cost and the current temperature of the simulated annealing process. If the new layout is accepted, then the new assigned positions of the netlist components moved in operation 410 will be retained. If the new layout is not accepted, then the previously assigned positions will be retained.

As discussed, the current temperature of the simulated annealing process may identify the process' current tolerance for accepting layout changes. Accordingly, while the temperature is high, the new layout may be accepted even if the new layout exhibits an increased system cost (e.g., within a range of permissible system cost increases associated with the current temperature). For example, if the system cost of the previous layout has a value of 150, and the system cost of the new layout is 165 (e.g., indicating reduced performance), then the new layout may still be accepted if the permissible system cost increase associated with the current temperature has a value of 20.

In operation 416, external system 130 determines whether equilibrium has been reached for the current temperature of the simulated annealing process. For example, a number of simulated layouts may be allotted for each temperature, and external system 130 may determine that equilibrium has been reached when the number of simulated layouts has been performed. If equilibrium has been reached, then the simulated annealing process continues to operation 418. Otherwise, the process returns to operation 408.

In operation 418, external system 130 reduces the current temperature based on a cooling schedule of the simulated annealing process. In some embodiments, a predetermined number of simulations may be performed for each temperature. The cooling schedule may gradually reduce the temperature over time, such that the tolerance for accepting new layouts that result in increased system costs may decrease over time.

In operation 420, external system 130 determines whether the current temperature has reached a frozen temperature for the simulated annealing process. For example, based on the cooling schedule, a frozen temperature may be set at which the simulation process may be finished. If the frozen temperature is not reached, the process proceeds to operation 422 where a repacking operation is performed, and then the process returns to operation 408 to operation 408 to continue simulation under a new temperature. If the frozen temperature is reached in operation 420, then the results of the placement process will correspond to the current layout (operation 424).

In some embodiments, repacking operation 422 may be performed periodically and need not be performed for every temperature update. For example, the frequency at which repacking operation 422 is performed may be adjusted as desired to tune the performance of the process. Similarly, additional repacking operations 308 and 312 previously discussed herein may be performed and/or omitted as desired.

Figure 5:
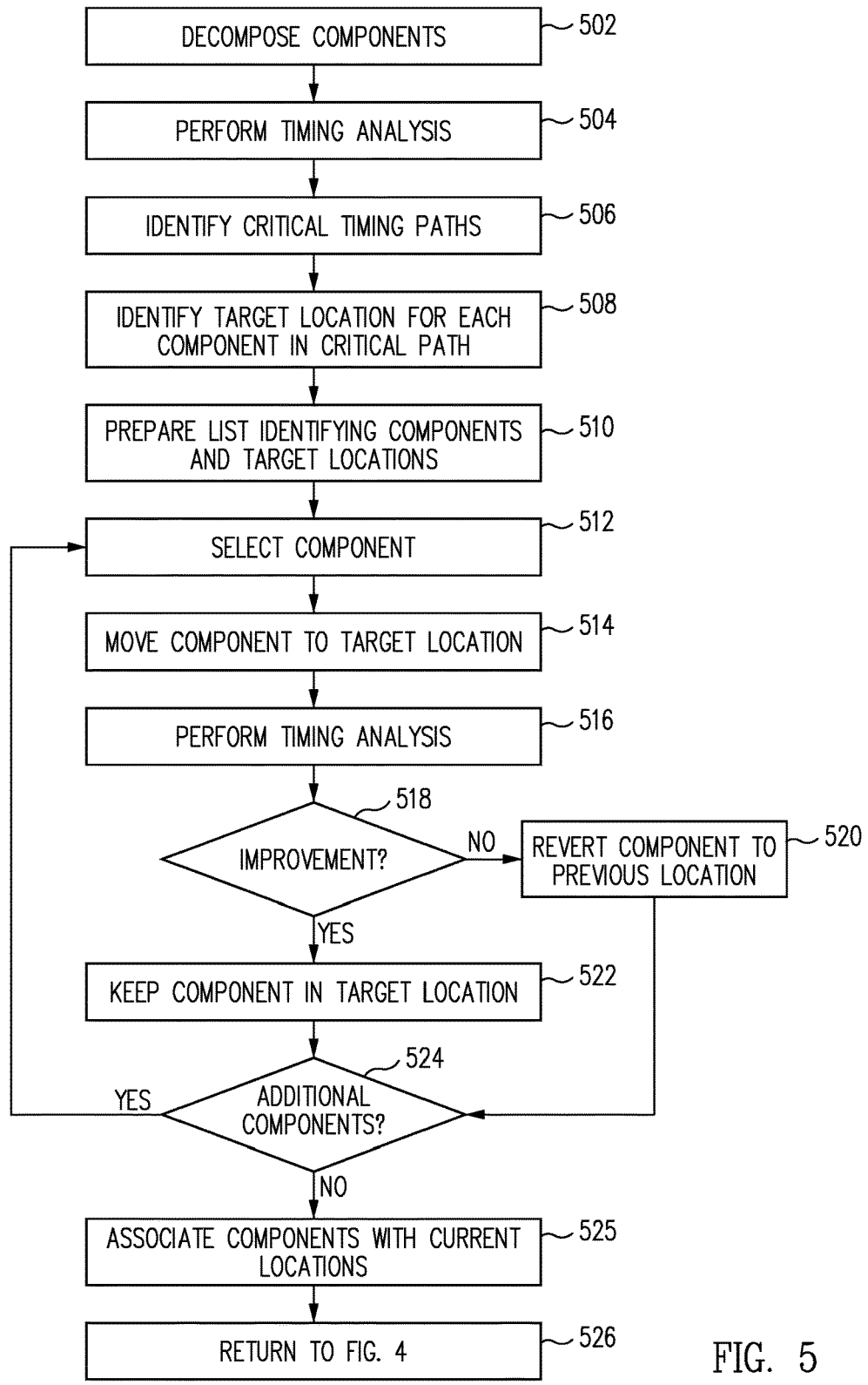
FIG. 5 illustrates a component repacking process for a PLD in accordance with an embodiment of the disclosure.

FIG. 5 illustrates a component repacking process for PLD 100 in accordance with an embodiment of the disclosure. In this regard, the process of FIG. 5 may be used to reassign (e.g., repack) physical components 200 into different logic blocks 104 (e.g., resulting in different groupings than those identified in mapping operation 305 or previous repacking operations). In some embodiments, the process of FIG. 5 may be performed by external system 130 during operations 306, 308, and 312 of FIG. 3, and in operation 422 of FIG. 4.

In operation 502, external system 130 decomposes the netlist components (e.g., previously placed in operations 404 and 410) from their associated logic blocks 104 and physical components 200. In this regard, external system 130 considers the netlist components individually for purposes of repacking into different physical component 200 locations in different logic blocks 104 (e.g., rather than considering all netlist components assigned to a given logic block 104 together as a single entity).

In operation 504, external system 130 performs a timing analysis of the user design based on the currently assigned component locations. In this regard, it will be appreciated that the timing analysis of operation 504 uses the locations of the actual physical components 200 rather than estimates based on logic-level operations that do not account for physical placement.

In operation 506, external system 130 determines critical signal paths of the user design based on the timing analysis. This may include, for example, identifying signal paths between physical components 200 that do not satisfy user design requirements (e.g., also referred to as constraints or preferences) such as, for example, maximum frequency, minimum or maximum delay, or other requirements.

In some embodiments, a timing slack value may be determined for each signal path. The timing slack value may be, for example, the difference between the maximum permissible delay (e.g., also referred to as required delay) and the actual delay associated with the signal path. If the actual delay is greater than the required delay, then the timing slack value for the signal path will be a negative value. In some embodiments, signal paths having negative timing slack values may be identified as critical signal paths.

In operation 508, external system 130 identifies a target location (e.g., a physical position within PLD 100) for each netlist component associated with a critical signal path that would satisfy or improve the timing of the user design. Such target locations may be identified, for example, based on the timing analysis (operation 504), application of component placement rules, signal analysis, PLD architecture constraints, user design requirements, and/or other criteria as appropriate. The target location may be a location that is different from the currently assigned location (e.g., the currently assigned logic block 104 or physical component 200) for the netlist component. In some embodiments, the target location may be identified by one or more particular logic blocks 104 of PLD 100, one or more particular physical components 200 within such logic blocks 104, and/or other locations or regions (e.g., combinations of multiple locations).

Figure 6:
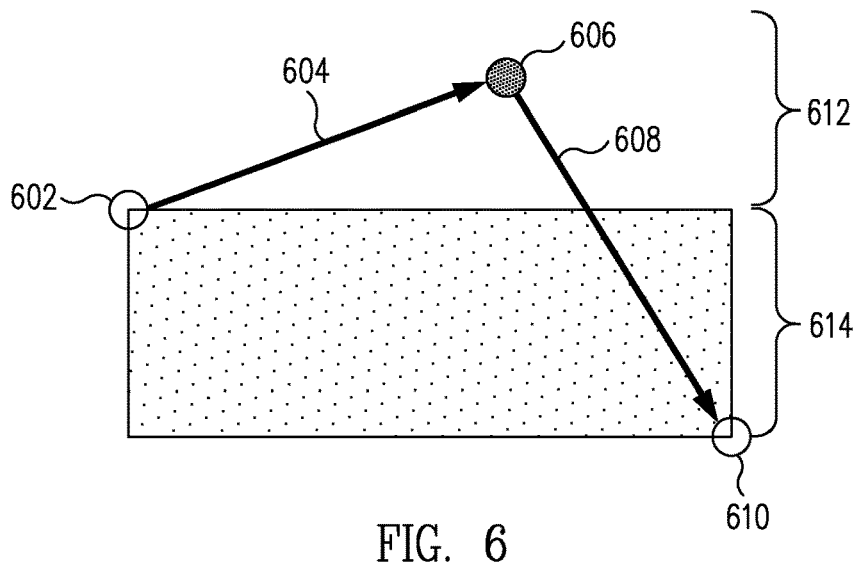
FIGS. 6-9 illustrate various component locations and associated signal paths in a PLD in accordance with embodiments of the disclosure.

Referring now to FIG. 6, several component locations are shown for an example user design implemented by PLD 100. A critical signal path (identified by arrows 604 and 608 which correspond to appropriate routing resources 180 of PLD 100) begins at a source component 602, passes through an intermediate component 606, and ends at a destination component 610. As shown, intermediate component 606 is currently placed at a location within a region 612 of PLD 100. However, this placement results in the signal path taking an indirect route between components 602 and 610 that is physically longer and subject to more delays than would be incurred if intermediate component 606 were positioned within a region 614. Thus, in this case, intermediate component 606 is identified as a critical component having a target location within region 614.

Figure 7:
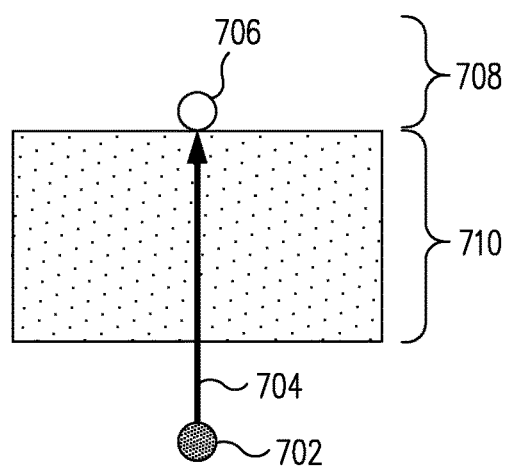
Figure 8:
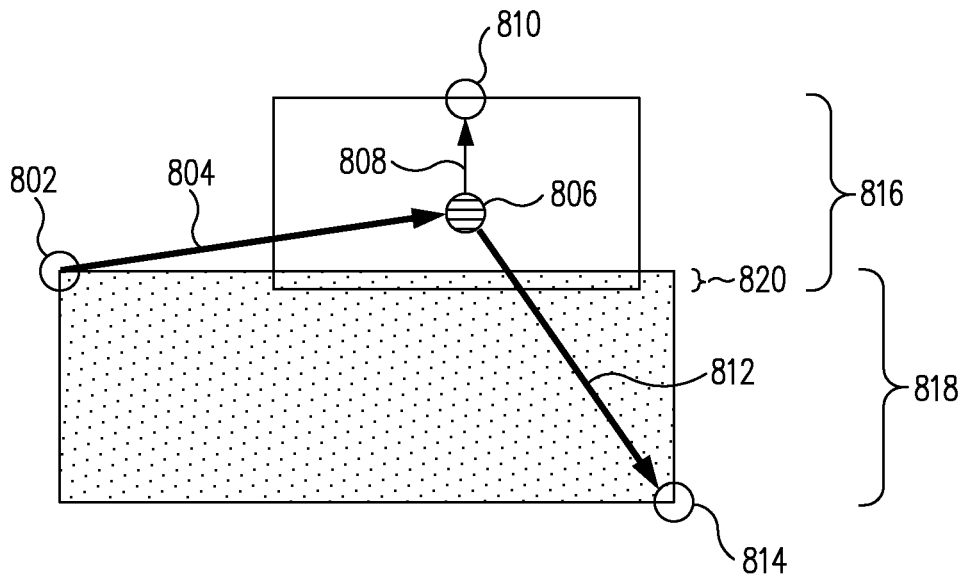
Figure 9:
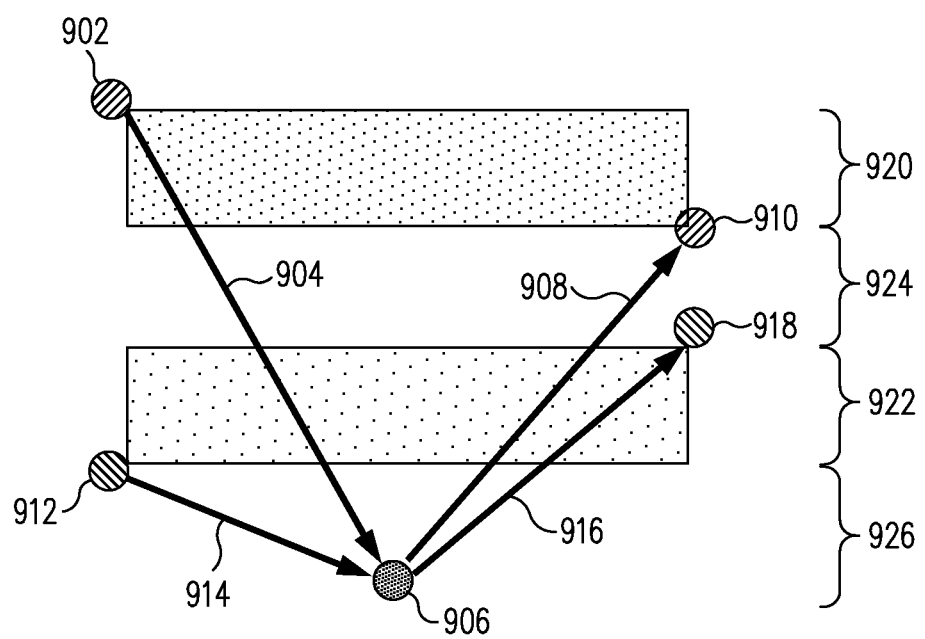

Additional examples of component locations are provided in FIGS. 7-9. In FIG. 7, a critical signal path (identified by arrow 704) begins at a source component 702 and ends at a destination component 706. As shown, destination component 706 is currently placed at a location within a region 708 of PLD 100. However, this placement results in the signal path being physically longer and subject to more delays than would be incurred if destination component 706 were positioned within a region 710. Thus, in this case, destination component 706 is identified as a critical component having a target location within region 710.

In FIG. 8, two critical signal paths are provided. A first critical signal path (identified by arrows 804 and 808) begins at a source component 802, passes through an intermediate component 806, and ends at a destination component 810. A second critical signal path (identified by arrows 804 and 812) begins at source component 802, passes through intermediate component 806, and ends at a destination component 814. As a result, intermediate component 806 may initially have two target locations, namely a region 816 for the first critical signal path, and a region 818 for the second critical signal path.

As shown, intermediate component 806 is currently placed at a location within region 816. However, this placement compromises the performance of the second critical signal path between components 804 and 814. Nevertheless, moving intermediate component 806 too far down into region 818 would compromise the performance of the first critical signal path between components 804 and 808. Thus, in this case, the two target locations (e.g., regions 816 and 818) for critical component 806 can be resolved to a single target location corresponding to a region 820 where regions 816 and 818 overlap.

In FIG. 9, two critical signal paths are provided. A first critical signal path (identified by arrows 904 and 908) begins at a source component 902, passes through an intermediate component 906, and ends at a destination component 910. A second critical signal path (identified by arrows 914 and 916) begins at source component 912, passes through intermediate component 906, and ends at a destination component 918. As a result, similar to FIG. 8, intermediate component 906 may initially have two target locations, namely a region 920 for the first critical signal path, and a region 922 for the second critical signal path.

As shown, intermediate component 906 is currently placed at a location within region 926. However, this placement compromises the performance of both the first and second critical signal paths. Moving intermediate component 906 into region 922 would compromise the performance of the first critical signal path between components 902 and 910. However, moving intermediate component 906 into region 920 would compromise the performance of the second critical signal path between components 912 and 918. Thus, in this case, the two target locations (e.g., regions 920 and 922) for critical component 906 can be resolved to a single target location corresponding to a region 924 between regions 920 and 922 to efficiently accommodate both critical signal paths.

Referring again to FIG. 5, in operation 510, external system 130 associates each critical path component (e.g., each netlist component for which a target location was identified in operation 508) with its corresponding target location in a list or other appropriate data structure.

In operation 512, external system 130 selects a critical path component from the list or other data structure prepared in operation 510.

In operation 514, external system 130 moves (e.g., assigns) the critical path component to its associated target location. In the examples discussed above for FIGS. 6-9, operation 514 would include moving component 606 from region 612 to region 614, moving component 706 from region 708 to region 710, moving component 806 from region 816 or 818 to region 820, and moving component 906 from region 920 or 922 to region 924.

In operation 516, external system 130 performs another timing analysis in the manner of operation 504, but using the new physical location for the selected critical path component.

In operation 518, external system 130 determines whether the new physical location results in an actual timing improvement. If so, then the new physical location is maintained (operation 522) and the process continues to operation 524. Otherwise, the component reverts to its previous location (operation 520) and the process continues to operation 524. In operation 524, external system 130 determines whether additional critical path components remain to be selected. If so, then the process returns to operation 512 where another critical path component is selected. Otherwise, the process continues to operation 525.

In operation 525, external system 130 associates the netlist components with their assigned logic blocks 104 and physical components 200. In this regard, the netlist components are effectively repacked into their new logic blocks 104. The process then returns to FIG. 4 (operation 526).

The component repacking techniques discussed herein may be used to improve signal timing and the ability of user designs to be implemented in a manner that meets user design preferences. For example, Table 1 below provides test results measuring a performance achievement percentage (PAP) value for various configurations of PLD 100 (e.g., designs 1-10) after performing a design process without repacking operations compared to a design process with repacking operations. The PAP values may be determined in accordance with the following equation:

PAP=minimum(actual timing/required timing, for all timing requirements)*100%

Accordingly, a PAP value of 100% indicates that all user design preferences have been met. In the examples shown in Table 1, the user design preferences have been set higher than required in order to better illustrate the improvements, thus resulting in PAP values of less than 100% for most of the examples. PAP values of 100% may be obtained when repacking techniques are applied to actual user design preferences. As shown in Table 1, when repacking is performed, a higher proportion of user design preferences are met.

TABLE 1

| Design | PAP Without Repacking | PAP With Repacking | PAP Difference |
|---|---|---|---|
| 1 | 88.1% | 95.3% | 8.2% |
| 2 | 93.2% | 98.9% | 6.1% |
| 3 | 94.9% | 98.2% | 3.5% |
| 4 | 90.2% | 90.3% | 0.1% |
| 5 | 95.2% | 96.2% | 1.1% |
| 6 | 70.7% | 80.2% | 13.4% |
| 7 | 97.3% | 100.0% | 2.8% |
| 8 | 73.6% | 75.4% | 2.4% |
| 9 | 89.5% | 90.7% | 1.3% |
| 10 | 88.1% | 95.3% | 8.2% |
| Average | 88.1% | 92.1% | 4.7% |

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method comprising:
   receiving in a processor, a design identifying operations to be performed by a programmable logic device (PLD), with logic blocks in pre-determined physical locations of the PLD;
   packing, in the processor, each of a plurality of components of the PLD into a respective one of a plurality of logic groups;
   determining, in the processor, a layout comprising assigned positions of the plurality of logic groups of the PLD configured to perform the operations;
   routing connections between the plurality of components;
   performing, in the processor, a timing analysis on the layout comprising both the assigned positions of the plurality of logic groups and the routed connections;
   selectively adjusting, in the processor, assigned positions of the plurality of components in the determined layout by repacking at least one of the plurality of components into another logic group of the plurality of logic groups using the timing analysis;
   generating an adjusted layout comprising the adjusted assigned positions of the plurality of components of the PLD, for configuring the PLD to perform the operations;
   storing the adjusted layout for configuring the PLD to perform the operations; and
   providing the PLD programmed based on the adjusted layout.

2. The method of claim 1, wherein the adjusting comprises:
   identifying a signal path between at least a subset of the plurality of components that does not satisfy a timing requirement of the design based on the timing analysis;
   identifying a target location in the PLD for at least one of the plurality of components in the signal path that satisfies the timing requirement; and
   adjusting the position of the component to the target location.

3. The method of claim 2, wherein the target location corresponds to a particular component position within a particular logic block of the PLD.

4. The method of claim 1, wherein the determining comprises assigning the plurality of logic groups to selected logic blocks of the PLD.

5. The method of claim 4, wherein the adjusting comprises moving each adjusted component from its first assigned logic block to a second different logic block.

6. The method of claim 4, wherein the plurality of components comprises lookup tables implemented in the logic blocks.

7. The method of claim 1, wherein the determining comprises performing a simulated annealing placement process to determine the positions of the plurality of components.

8. The method of claim 7, wherein the timing analysis and the adjusting are performed during and/or after the simulated annealing placement process, the method further comprising providing a configuration file containing the adjusted layout for configuring the PLD to perform the operations.

9. The method of claim 7, further comprising routing connections between the plurality of components after the simulated annealing placement process.

10. A system comprising:
    a processor; and
    a memory adapted to store a plurality of computer readable instructions which when executed by the processor are adapted to cause the system to perform a computer-implemented method comprising:
      receiving a design identifying operations to be performed by a programmable logic device (PLD), with logic blocks in pre-determined physical locations of the PLD,
      packing each of a plurality of components of the PLD into a respective one of a plurality of logic groups,
      determining a layout comprising assigned positions of the plurality of logic groups of the PLD configured to perform the operations,
      routing connections between the plurality of components,
      performing a timing analysis on the layout comprising both the assigned positions of the plurality of logic groups and the routed connections,
      selectively adjusting assigned positions of the plurality of components in the determined layout by repacking at least one of the plurality of components into another logic group of the plurality of logic groups based on the timing analysis,
      generating an adjusted layout comprising the adjusted assigned positions of the plurality of components of the PLD, for configuring the PLD to perform the operations,
      storing the adjusted layout for configuring the PLD to perform the operations, and
      programming the PLD with the adjusted layout.

11. The system of claim 10, wherein the adjusting comprises:
    identifying a signal path between at least a subset of the plurality of components that does not satisfy a timing requirement of the design based on the timing analysis;
    identifying a target location in the PLD for at least one of the plurality of components in the signal path that satisfies the timing requirement; and
    adjusting the position of the component to the target location.

12. The system of claim 11, wherein the target location corresponds to a particular component position within a particular logic block of the PLD.

13. The system of claim 10, wherein the determining comprises assigning the plurality of logic groups to logic blocks of the PLD, and wherein the adjusting comprises moving each adjusted component from its first assigned logic block to a second different logic block.

14. The system of claim 10, wherein the determining comprises performing a simulated annealing placement process to determine the positions of the plurality of components.

15. The system of claim 14, wherein the timing analysis and the adjusting are performed during and/or after the simulated annealing placement process.

16. The system of claim 14, wherein the method further comprises routing connections between the plurality of components after the simulated annealing placement process.

17. A method comprising:
receiving in a processor, a design identifying operations to be performed by a programmable logic device (PLD), with logic blocks in pre-determined physical locations of the PLD;
packing, in the processor, each of a plurality of components of the PLD into a respective one of a plurality of logic groups;
determining, in the processor, a layout comprising assigned positions of the plurality of logic groups of the PLD configured to perform the operations;
routing connections between the plurality of components;
performing, in the processor, a timing analysis on the layout comprising both the assigned positions of the plurality of logic groups and the routed connections;
selectively adjusting, in the processor, assigned positions of the plurality of components in the determined layout by repacking at least one of the plurality of components into another logic group of the plurality of logic groups using the timing analysis;
generating an adjusted layout comprising the adjusted assigned positions of the plurality of components of the PLD, for configuring the PLD to perform the operations;
storing the adjusted layout for configuring the PLD to perform the operations; and
programming the PLD with the adjusted layout.

18. A non-transitory machine-readable medium storing a plurality of machine-readable instructions which when executed by one or more processors of a computer system are adapted to cause the computer system to perform the method of claim 17.

19. The method of claim 18, wherein:
the adjusting comprises:
identifying a signal path between at least a subset of the plurality of components that does not satisfy a timing requirement of the design based on the timing analysis;
identifying a target location in the PLD for at least one of the plurality of components in the signal path that satisfies the timing requirement; and
adjusting the position of the component to the target location; and
the determining comprises performing a simulated annealing placement process to determine the positions of the plurality of components.

20. The method of claim 18, further comprising providing the PLD programmed with the adjusted layout.

* * * * *